United States Patent [19]

Stortz

[11] 4,218,917
[45] Aug. 26, 1980

[54] OUTDOORS THERMOMETER UNIT

[75] Inventor: Robert K. Stortz, Brookfield, Wis.

[73] Assignee: The Ohio Thermometer Company, Springfield, Ohio

[21] Appl. No.: 959,720

[22] Filed: Nov. 13, 1978

[51] Int. Cl.³ .............................................. G01K 1/14
[52] U.S. Cl. ...................................................... 73/378
[58] Field of Search ................. 73/339 R, 339 C, 340, 73/371, 374–378

[56] References Cited

U.S. PATENT DOCUMENTS

| | | | |
|---|---|---|---|
| 1,605,466 | 11/1926 | Roedell | 73/378 |
| 2,351,880 | 6/1944 | Sauer | 73/378 |
| 2,878,673 | 3/1959 | Christensen | 73/374 X |
| 3,196,684 | 7/1965 | Vernon | 73/378 X |
| 4,116,065 | 9/1978 | Jensen | 73/378 |

Primary Examiner—Donald Watkins
Attorney, Agent, or Firm—Jerome P. Bloom

[57] ABSTRACT

A thermometer device for application to an exterior of a structure, such as a vehicle, having one face viewed from the interior of the structure, including a thermometer element and a readout portion, a housing for nesting the thermometer element in a sheltered manner and having air inlet and outlet openings to allow ambient air to enter and pass over the thermometer element and at the same time protects the element from the suns rays.

22 Claims, 14 Drawing Figures

U.S. Patent  Aug. 26, 1980  Sheet 1 of 2  4,218,917
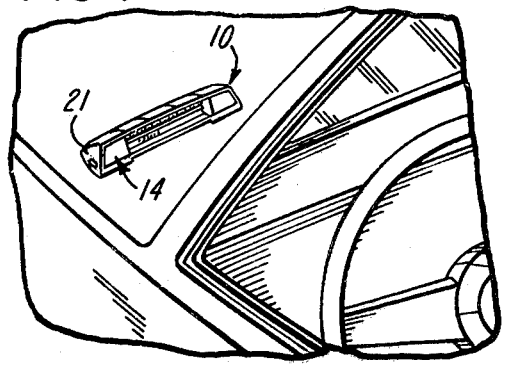
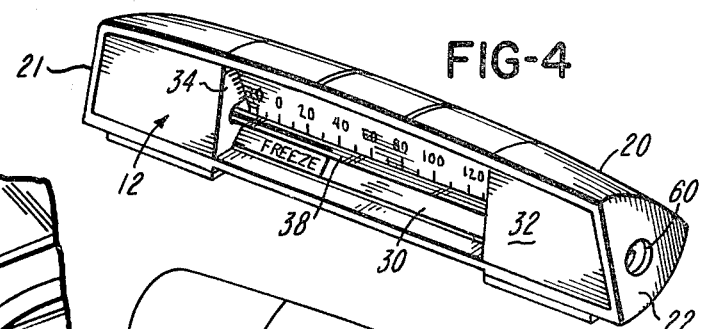
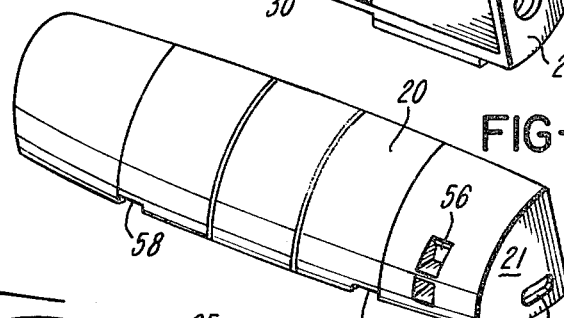
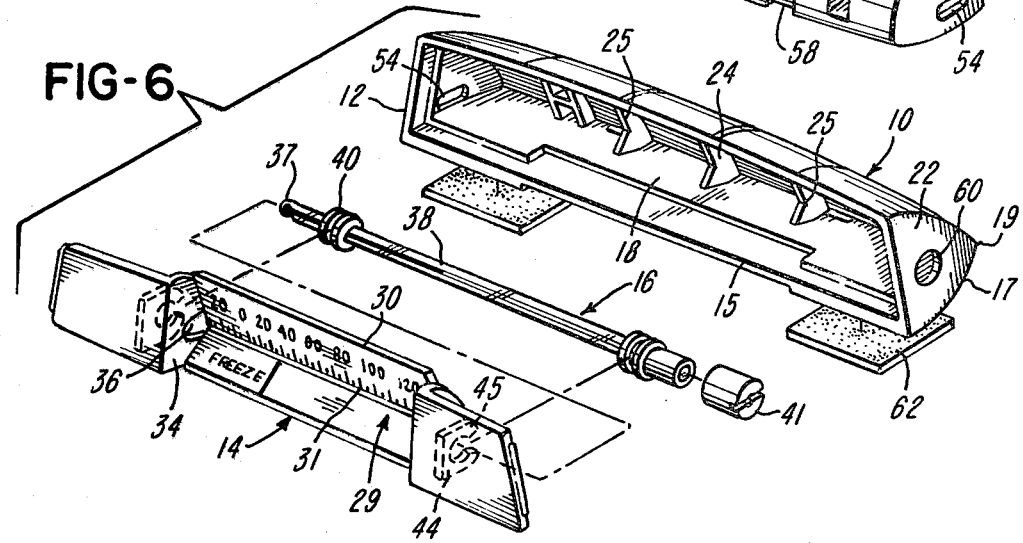
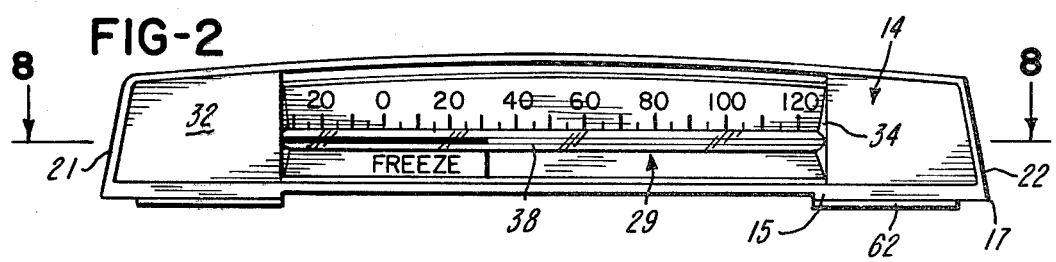

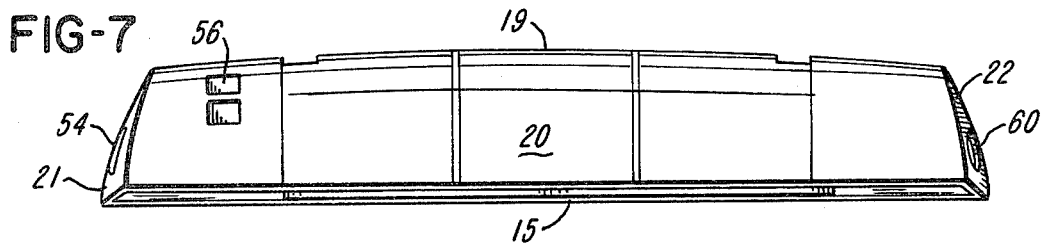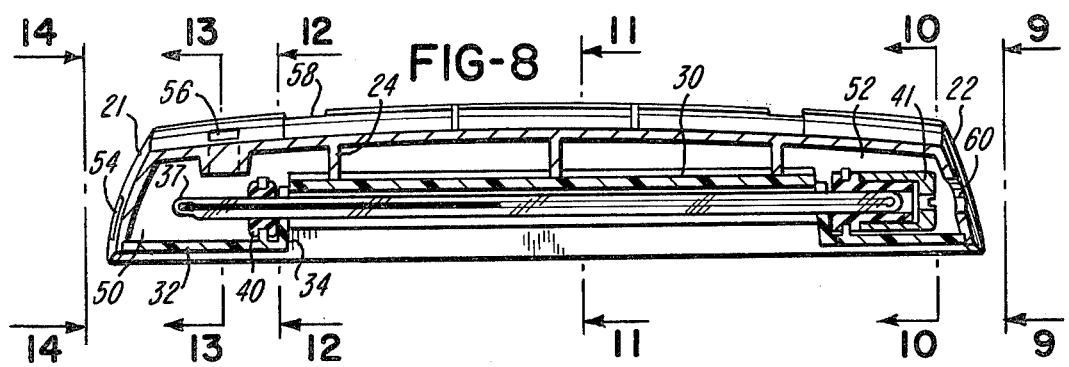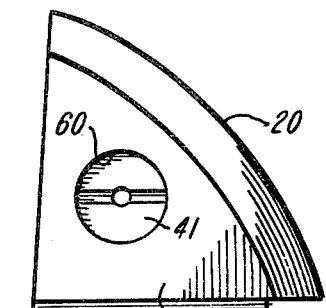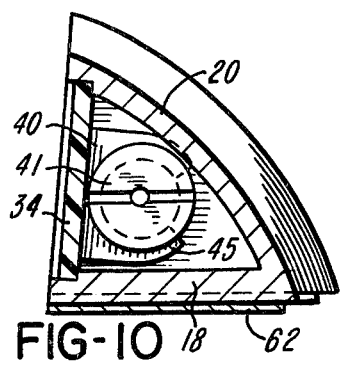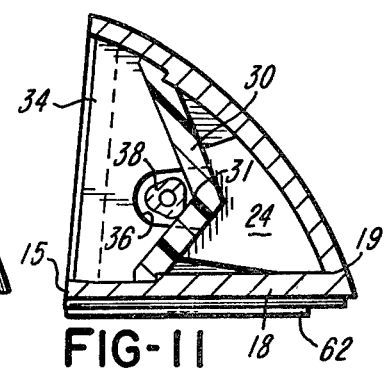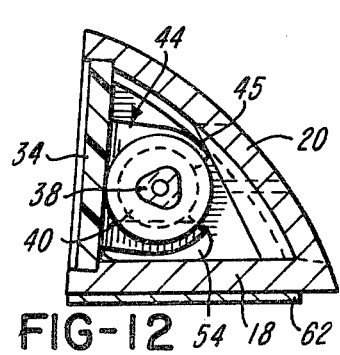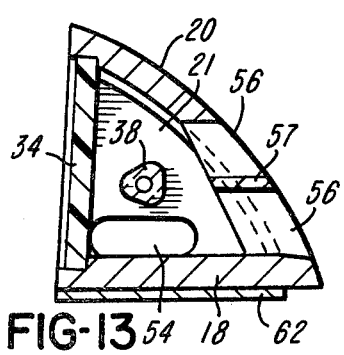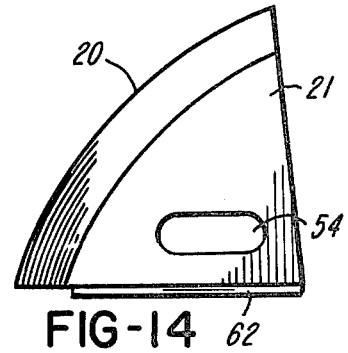

OUTDOORS THERMOMETER UNIT

BACKGROUND OF THE INVENTION

This invention relates to an especially accurate outdoors thermometer unit which may be easily read. The preferred embodiment herein illustrated has special utility for usage on the exterior of a vehicle. It should be understood, however, that neither the form of embodiment of the invention nor its application need be so limited and such is not intended.

Though making of thermometers is a very old and long established art, significant developments in this field have been few and far between, particularly in recent years. Most of the research in this industry has been concerned with visual appearance since this is a feature that more times than not will induce a purchase. In this last respect outdoor thermometers have had particular attention but while they have been produced in many interesting forms and with minor improvements in their mode of support and housing, it seems that little attention has been paid to their accuracy. The accuracy of those reasonably priced units which reach the average purchaser leaves much to be desired and it is oftentimes the nature and characteristic of a thermometer support or housing that contributes to inaccuracies in their readings.

A further negative characteristic of the common outdoor thermometer is that its mount or housing is so designed that it can inadvertently be easily broken.

It was to the solution of such problems as noted with respect to the common, relatively inexpensive thermometers that the efforts which resulted in the present invention were directed.

SUMMARY OF THE INVENTION

Preferred embodiments of the invention have particular utility for use outdoors and for mount on the hood of a moving vehicle. The invention construction provides for a thermometer to be housed so that only its sheltered sensing bulb is exposed to the ambient air through which the vehicle moves. The bulb is contained in a manner that is essentially shielded from the disruptive temperature influence of direct rays of the sun or reflectors. The housing is designed to expose to the driver of the vehicle on which the thermometer unit is mounted only that portion thereof from which a reading may be taken. A feature of the mount of the thermometer is that it may be rotated within its housing so as to enable it to be presented in the best possible position for viewing from the interior of the vehicle to which it is applied.

Preferred embodiments of the invention feature a face plate for the housing so designed to nest and simply and releasably fit thereto the thermometer per se. For that matter, the whole construction of the thermometer unit lends itself to a simple, economical and easy assembly thereof.

In any case a thermometer device in accordance with the invention comprises a thermometer including a temperature sensing and a readout portion having a housing and being so disposed in said housing that the sensing portion is arranged in a chamber which has an inlet for the ambient air which is exterior to said housing and so protected that it is influenced, essentially, solely by the temperature of the ambient air.

The foregoing and other features of embodiments of the invention will be further apparent from the description of the preferred embodiment thereof which follows.

In their many years of experience in the art with which the invention is concerned, the inventor and his associates have obtained no knowledge of any prior art which is particularly pertinent to the essential features for the present invention.

A primary object of the invention is to provide improvements in thermometer units rendering them particularly advantageous as simple, economical and highly accurate devices for outdoor usage.

Another object of the invention is to provide a thermometer so housed as to present only a sensing bulb to ambient air, and under conditions wherein the bulb is shielded from disruptive influence such as the direct rays of the sun.

Another object of the invention is to provide a thermometer unit which is especially designed for accurate usage on the exterior of a moving vehicle.

A further object of the invention is to provide a thermometer construction especially desirable for usage in outdoor locations wherein the body of the thermometer may be rotated to facilitate a temperature reading.

An additional object of the invention is to provide a thermometer so housed as to indirectly expose its bulb portion to ambient air while the remainder thereof is nested in and protected by means adapted to reflect impacting rays, preventing the rays from exerting disruptive influences on the thermometer, thereby to affect its readings.

An additional object is to provide a simply fabricated thermometer unit particularly advantageous for outdoor usage wherein the thermometer is so housed as to preclude its inadvertent breakage.

A further object of the invention is to provide an economical thermometer unit, particularly suited for safe outdoor usage which possesses the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein one but not the only form of embodiment of the invention is illustrated.

FIG. 1 is a fragmentary view of a vehicle illustrating a preferred embodiment of the invention applied to its hood;

FIG. 2 is a front elevation view of the face portion of the thermometer unit of FIG. 1;

FIG. 3 is a bottom view of the thermometer unit;

FIG. 4 is a view of the thermometer unit, taken in perspective to feature the face portion and one side of the thermometer unit, thereby to exhibit its streamline configuration;

FIG. 5 is a view of the thermometer unit taken in perspective from an angle opposite to that from which the unit is viewed in FIG. 4;

FIG. 6 is an exploded view of the thermometer unit;

FIG. 7 is a top view of the thermometer unit;

FIG. 8 is a sectional view taken substantially on line 8—8 of FIG. 2; and

FIGS. 9-14 are sectional views respectively taken on lines 9—9, 10—10, 11—11, 12—12, 13—13 and 14—14 of FIG. 8.

The embodiment of the invention illustrated is comprised of a shell-like housing 10 having an open side 12 nesting and capped by a face plate 14 mounting a thermometer assembly 16.

The housing 10 has a streamlined aerodynamically designed configuration and includes a bottom wall 18 which is longitudinally extended from end to end, short in front to rear depth and formed to curve at its ends 17. The curves at the ends 17 are symmetrical and slightly convergent as they extend from the front 15 to the rear edge 19 of the bottom wall 18. Formed integral with the rear edge 19 and extending upwardly thereof and forwardly therefrom in a smoothly curved configuration is the rear wall 20 of the housing 10. The edge of the wall 20 which joins the bottom wall is coextensive therewith in length. As it curves upwardly and forwardly, the rear wall 20 almost completely overlies the bottom wall 18, its forwardmost and uppermost edge portions terminating just short of a vertical plane which would include the front edge 15 of the bottom wall 18. The arrangement is such that the forward facing edge portions of the bottom and rear walls 18 and 20 are inclined to lie in a common plane which inclines upwardly and rearwardly from a plane perpendicular to the base surface to which the housing 10 seats.

The lateral extremities of the bottom wall 18 and the rear wall 20 are joined by arcuately contoured plate-like side walls 21 and 22 formed integral therewith. The side walls 21 and 22 are identical and smoothly and flatly curved as their outer surfaces converge somewhat front to rear of the housing and converge to a slight degree as they extend upwardly from the lateral extremities of the bottom wall 18. As will be seen, the upper portion of the rear wall 20 serves also to provide the top wall of the housing 10.

Projected forwardly from and perpendicular to the inner surface of the rear wall 20, in longitudinally spaced relation, are plate-like segments 24 formed integral with its lower half. The projections 24 are parallel and the outermost thereof are equidistantly spaced inwardly of and from the housing side walls 21 and 22. The forwardmost projected edge of each of the plate-like segments 24 is provided with a triangular notch 25.

Face plate 14, which fills the open side of the housing 10, has its peripheral edge portions appropriately configured to essentially precisely fit within and to seat to recessed shoulders formed in the wall structure which rims this opening.

The longitudinally extended portion 30 of the plate 14, the length of which is more than one-half of the longitudinal extent of the plate, is offset from its end portions 32, the latter of which are equal in length. As the face plate is applied to the housing, its central portion 30 lies inwardly of the housing 20 and its end portions 32. The offset arrangement described provides that the central portion 30 is bounded at its lateral extremities by face plate portions 34 which are substantially parallel and generally perpendicular to the plate portions 32, to which they are respectively joined at their forwardmost edges.

The central plate portion 30 has a channel-like form producing in the outer face and from end to end thereof a longitudinally extending concavity 29 having a triangular cross section. The recessed apex of the concavity or channel 29 is defined by a line 31 which extends intermediately of and parallel to what might be considered the upper and lower edges of the face plate 14. As seen in the drawings, the line 31 is more closely adjacent the lower than the upper edge of the plate portion 30.

The portion of each of the plate portions 34 which bound or cap the respective ends of the channel 29 has an opening 36 in line with the apex portion of the channel. The openings 36 are somewhat elongated in a sense from front to rear of the plate portions 34 and by virtue of their alignment are arranged to accommodate the slip fit insertion therethrough of a thermometer 38 the read out portion of which is nested in the channel 29 and thereby presented in a nested relation to the front of the plate portion 30. As the read out portion of the thermometer is so nested, the one end portion which includes its sensing bulb disposes in a chamber 50 defined in the housing 10 beyond the adjacent face plate portion 34. The other end of the thermometer projects beyond the remote face plate portion 34 into a chamber 52 at the opposite end of the housing 10.

In the assembly of the thermometer 38 and in its application to the face plate 14 there is applied thereto, adjacent and spaced inwardly of each of its respective ends, a grommet 40 which has a circumferential groove. One grommet 40 is located adjacent and spaced inwardly of the sensing bulb portion 37 of the thermometer and the second grommet 40 is located adjacent and spaced inwardly of the opposite end of this thermometer. The grommets 40 are so applied and located in order that the grommets align with grommet holders 44 respectively integral with and projected perpendicular to the rear face of the plate portions 32 as the thermometer is applied to form an assembly with the face plate.

The grommet holders 44 each have a plate-like configuration and they are located immediately outward of the plate portions 34 and arranged generally parallel thereto. The inwardly projected edges of the grommet holders 44 are each formed with a notch, the configuration of which is determined by opposed vertically spaced fingers 45 which are convergently curved at their projected ends. The projected ends of the fingers 45 of each grommet holder so vertically spaced are adapted to receive therebetween the grooved and thereby recessed portion of an aligned grommet 40. The respective dimensions of the grommet holder and the grooves in the grommets are so determined that the grommets are snap fit into the spaced fingers of the related grommet holders, which fingers dispose in the circumferential groove of the grommet body applied and in substantially encompassing relation to the base thereof.

When the thermometer 38 is assembled to its face plate 14 in a manner believed clear from the foregoing, the end thereof in the chamber 52 is provided with a cap 41 formed of resilient material. The cap 41 is dimensioned to have an adhering fit to and about the end of the thermometer to which it is applied so that on a turning thereof there will be a corresponding turning of the body of the thermometer 38. To faciliate such a turning of the thermometer in and relative to the face plate, the outer end of the cap 41 is provided with a diametral slot or groove. This last enables the blade of a screwdriver or similarly configured object to be inserted in the slot or groove, thereby to facilitate an easy rotation of the thermometer in its seat and in reference to the forward portion of the face plate in which it nests.

It will be seen from the foregoing that the thermometer assembly comprised of the thermometer 38 and the grommets 40 is given a firm, resilient mount as the thermometer is inserted through the apertures 36 in the face plate and the grommets which are applied thereto are snap fit in the holders 44. Of course, the face plate, the thermometer, the grommets 40 and the cap 41 are totally assembled before the face plate is fit into the open side of the housing 10 and to the outwardly facing shoulders previously mentioned which are provided by recesses appropriately formed in the inner surfaces of the bottom, side and top wall of the housing 10, at their forwardmost edges.

The angular relation of the upper and lower portions of the central plate portion 30 of the face plate provides a rear surface thereof which is complementary to the shape of the triangular notches 25 formed in the plate-like projections 24. The arrangement and dimensioning of the parts are such that in the application of the face plate the rearmost surface of the central plate portion 30 thereof is enabled to be firmly nested in and seated to the edge portions of the projections 24 which define the notches 25. This gives the thermometer unit a relatively rugged construction and in the process of the assembly the chambers 50 and 52 are respectively defined to either end of the housing 10. The front wall of each chamber is provided by a face plate portion 32 while the respective side wall portions 21 and 22 provide the outer side walls of the respective chambers as the rear wall 20 provides the rear and top wall of each chamber. The inner side wall of the respective chambers are defined in each case by a face plate portion 34 and one of the projections 24.

As may be seen from the drawings, the sensing bulb portion 37 of the thermometer is essentially isolated in the chamber 50 and locates in adjacent though closely spaced relation to the side wall 21. The latter has an aperture 54 therein immediately above the bottom wall 18. The aperture 54 is short of depth but elongated in a sense from front to rear of the housing 10 and lies immediately below the level of the sensing bulb, which is in adjacent spaced relation thereto. The rear wall portion of the housing 10 which bounds the rear of the chamber 50 has an aperture 56 therein. The aperture 56 lies in offset relation to the sensing bulb and towards the adjacent wall portion 34. The aperture 56 is generally rectangular and extends upwardly from the bottom wall 18 to a location above the level of the thermometer. The vertical extent of the aperture 56 is intersected intermediate its vertical extremities by a thin centrally located bridging strip which divides the aperture 56 into an upper and a lower portion. As will be seen, the divided aperture 56 will in use of the thermometer unit on the hood of a vehicle be in facing relation to the direction in which the vehicle travels. The arrangement permits that ambient air may move into the chamber 50 and about the neck of the thermometer and spread about the sensing bulb to give a true exposure of the thermometer to the actual temperature of the ambient air, uninfluenced by disruptive forces. The aperture 54 which is adjacent and spaced from the sensing bulb 37 serves as an exit aperture for that air which enters the thermometer and passes over and in enveloping relation to the sensing bulb.

At two points where the rear wall 20 joins the bottom wall 18 of the housing 10, respectively communicating with the innermost ends of the chambers 50 and 52, there are drain apertures 58. Also, the side wall 22 has an access opening 60 in alignment with the adjacent relatively spaced slotted or grooved end of the cap 41. This last facilitates the application of a screwdriver or other blade-like object within the chamber 52 and to the cap 41 for rotation of the thermometer under conditions to be further described.

As seen in FIG. 2 of the drawings, while the body of the thermometer 38 conventionally includes the spirit medium which is used to indicate sensed temperature, the scale for the thermometer is applied to the upper and outwardly facing inclined surface portion of the central plate portion 30 of the face plate 14. The lower portion of the plate portion 30 is appropriately marked to indicate the freezing zone of the thermometer scale. Thus, with appropriate application of a thermometer the body of which is devoid of markings, one may by simple application of the thermometer to the face plate as previously described establish its spirit fluid in an appropriate relation to the scale embodied on the face of the plate portion 30.

Fixed at each of the opposite ends of the under surface of the bottom wall 18 of the housing 10 is a section 62 of black vinyl foam tape which is double coated with pressure sensitive adhesive. The exposed under side of the tape has applied thereto a strip of protective film. This film is peeled off at such time as the thermometer unit is to be installed on the hood of a vehicle. The manner of the application of the thermometer unit to the vehicle is believed obvious and therefore should require no further description.

The outer surface of the thermometer is particularly finished to lend further benefit to the invention unit. That portion of the outer surface of the rear wall 20 which backs and overlies the area of the interior of the housing 10 to the rear of the central plate portion 30 of the face plate 14 has a satin chromed finish to give it diverse reflecting surfaces. A bright chrome finish is provided on the remainder of the rear wall 20 which backs and overlies the chambers 50 an 52. The outer surfaces of the side walls 21 and 22 are similarly brightly chromed. Other than within the recessed central plate portion 30 thereof the outer surface portions of the face plate 14 are provided with a reflective silver colored coating.

In the preferred application of the thermometer unit herein illustrated, it is mounted to the hood of a vehicle, as seen in FIG. 1, to be readily visible to the operator of the vehicle and its occupants. As disposed, the rear wall 20 of the housing 10 has the vertical extent thereof, including the partitioned aperture 56, facing forwardly of the vehicle and away from the operator. By the same token, that portion of the housing which incorporates the face plate 14 faces and exposes to the operator the read out portion of the thermometer 38, to the extent that it lies between the plate portions 34. Accordingly, the read out portion of the thermometer is nested in the channel provided by the plate portion 30 and thereby sheltered from direct exposure to adverse influences. As noted previously, by a simple turning of the cap 41, in an appropriate fashion, one can dispose the spirit level of the thermometer in the best attitude for referencing it to the scale on the forward facing surface of the plate portion 30 and for optimal viewing of the read out portion by the occupants of the vehicle.

As indicated previously, the thermometer unit is mounted to the vehicle hood through the medium of adhesive applied to the outermost surface of the sections of black vinyl foam in connection with the bottom wall 18. This gives a resilient mount for the thermometer. At the same time, as the cap 41 and the connected thermometer 38 are rotated and as the thermometer assembly is mounted, the thermometer per se is resiliently balanced and positioned.

When the vehicle is driven, ambient air exterior to the vehicle will be induced, inherently, to move into the chamber 50, in an obvious manner, by way of the partitioned aperture 56. In the process this air will not impinge directly on the sensing bulb but will rather move about that portion of the thermometer immediately preceding the bulb and its neck and then spread about the bulb and envelope the same as it is induced to exit from the chamber 50 by way of the aperture 54. Particular attention is drawn to the fact that the nature of the reflective surface portions of the housing 10 which embody the sensing portion of the thermometer insures a shielding of the sheltered bulb 37 and directs away from the bulb any rays such as those of the sun which may reach the thermometer unit as the vehicle is being operated. Also, there is a diverse reflection of such rays as impinge upon that area of the housing which bounds the interior portion thereof in backing relation to the central portion 30 of the face plate 14. This avoids any direct disturbing influence that would adversely affect the accuracy of the reading of the temperature of the ambient air by the bulb 37. Note, moreover, the recessed positioning of the read out portion of the thermometer has similar benefits and also contributes to divorcing the sensing bulb from disruptive influences of the reflected rays or direct rays of the sun. The construction substantially eliminates direct and indirect heating of the bulb 37. In this last respect, the positioning of the bulb 37 in the chamber 50 so as to be offset from both the apertures 54 and 56 is worthy of note.

The features described all contribute to the desired end result, the achievement of a highly accurate inexpensive thermometer especially advantageous for outdoor usage. Of no less value is the nature and form of construction of the thermometer which enables its economical manufacture and embodies the fature which permits a ready rotation of the thermometer in place. Moreover, the sheltered and recessed mount of the thermometer substantially eliminates chance of breakage.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A thermometer device for application to the exterior of a structure, particularly advantageous for application to a vehicle, to have one face thereof viewed from the interior of the structure to which it is applied, including a thermometer element having a temperature sensing portion and a readout portion, a housing one face of which has a longitudinally extending portion thereof which is recessed to nest said readout portion of said thermometer element intermediately of and in a sheltered relation to portions of said housing which bound said recessed portion, one of said bounding portions including a chamber separated from said recess which receives and houses therein said sensing portion of said thermometer element, said chamber having an inlet opening thereto from the face portion of said housing opposite said one face thereof and an exit opening in communicating relation with the exterior environment of said housing, and said sensing portion of said thermometer element being positioned in said chamber at a location wherein it is out of a direct alignment with said inlet opening to said chamber, the arrangement providing for ambient air to move to and through said chamber in a manner to subject said sensing portion of said thermometer element to the actual temperature thereof while said sensing portion is positioned in a relatively sheltered relation within said housing which inhibits the impingement thereon of direct or reflected rays of the sun which would adversely affect or preclude an accurate readout as to the temperature of the ambient air.

2. Apparatus as in claim 1 wherein said sensing portion of said thermometer is positioned in an offset and spaced relation to said inlet to avoid direct exposure of said sensing portion to the environment which is exterior to said chamber.

3. A thermometer device comprising a thermometer including a temperature sensing portion and a readout portion, a housing, said thermometer being sheltered by said housing, means defining a chamber in said housing, said sensing portion of said thermometer being disposed in said chamber and said housing having a limited inlet to said chamber for flow therein of ambient air which is exterior to said housing to provide that said sensing portion is exposed to the actual temperature of the ambient air in a sheltered environment, said chamber being defined in one portion of said housing and a second chamber at an end of said housing remote from said one portion thereof containing the end of said thermometer remote from said sensing portion and said thermometer being mounted for rotation in and with respect to said housing.

4. A device as in claim 3 wherein said remote end of said thermometer mounts a cap and said housing has a further opening in line with said cap providing access thereto, through the medium of which cap said thermometer may be rotated in place, in and with respect to said housing.

5. A thermometer device comprising a thermometer including a temperature sensing portion and a readout portion, a housing, said thermometer being sheltered by said housing, means defining a chamber in said housing, said sensing portion of said thermometer being disposed in said chamber and said housing having a limited inlet to said chamber for flow therein of ambient air which is exterior to said housing to provide that said sensing portion is exposed to the actual temperature of the ambient air in a sheltered environment, said housing including a shell-like structure one side of which is open and capped by a plate-like structure, a central portion of said plate-like structure being formed to position within and in a recessed relation to said shell-like structure and said shell-like structure embodying means accommodating and seating said central portion of said plate-like structure whereby to position said plate-like structure as required to complete the enclosure provided by said housing.

6. A device as in claim 5 wherein said central portion of said plate-like structure is channel shaped in cross section and nests said read out portion of said thermometer in the channel thereof and said plate-like structure is configured to provide said one chamber in the application thereof to said shell-like structure and further configured to provide a second chamber in the application thereof to said shell-like structure and said chambers are defined to respectively opposite ends of said housing and to respectively accommodate the respective ends of said thermometer.

7. A device as in claim 6 wherein each of said chambers has a drain opening.

8. Apparatus as in claim 1 wherein the outer surface of said housing is formed of reflective material to disperse the direct and reflected rays of the sun in a manner to further preclude adverse effects on the temperature readings taken by said sensing portion of said thermometer and reflected in said read out portion of said thermometer.

9. A thermometer device comprising a thermometer including a temperature sensing portion and a readout portion, a housing, said thermometer being sheltered by said housing, said housing comprising a longitudinally extended bottom plate portion, a rear wall portion which curves upwardly and over said bottom wall portion to form a top wall portion of said housing and the forwardmost wall portion of said housing being provided by a plate-like structure at least one longitudinally extending portion of which is channel shaped in cross section and nests therein said readout portion of said thermometer the respective ends of which are projected into separate chambers at opposite ends of said housing.

10. A thermometer device comprising a thermometer including a temperature sensing portion and a readout portion, a housing, said thermometer being sheltered by said housing, means defining a chamber in said housing, said sensing portion of said thermometer being disposed in said chamber and said housing having a limited inlet to said chamber for flow therein of ambient air which is exterior to said housing to provide that said sensing portion is exposed to the actual temperature of the ambient air in a sheltered environment, said housing being adapted for mounting on a vehicle or other exterior structure and being comprised of a shell-like structure one face of which has a curved contour and includes an opening defining said inlet and an opposite surface of which presents said readout portion of said thermometer in an exposed relation thereto, said surfaces being joined at their ends by side portions of said housing one of which includes an opening defining an outlet from said chamber.

11. A thermometer device as in claim 10 wherein said housing has a second chamber remote from said sensing portion of said thermometer, said second chamber contains therein the opposite end of said thermometer which embodies means to facilitate rotation of said thermometer in and with respect to said housing and access is provided to said last mentioned means by way of an opening in the side wall of said housing adjacent thereto.

12. A thermometer device for mounting in an air stream, as on a vehicle exterior, to sense and display air temperature, including a housing a leading face of which in reference to direction of flow of the air stream is aerodynamically configured for low air resistance, the opposite or trailing face of said housing having an opening closed by a face plate, a central portion of which is recessed within said housing and displays a temperature scale, end portions of said plate cooperating with walls of said housing to define at least two interior housing chambers, a thermometer carried by said face plate to extend across said temperature scale, opposite ends of said thermometer extending into said chambers, the one chamber accommodating reception of the temperature sensing end of said thermometer therein communicating with ambient surroundings in a manner providing for a movement of air through said chamber.

13. A thermometer device according to claim 12 the end portion of said thermometer opposite said temperature sensing end having means in connection therewith made accessible by said housing to facilitate adjustment of said thermometer relative to said temperature scale.

14. A thermometer device according to claim 13, wherein said thermometer has longitudinally spaced apart grommets thereon and said face plate has holders in which said grommets are gripped with freedom of relative rotary motion.

15. A thermometer device according to claim 12, wherein said housing has a relatively low and wide profile, is relatively short in depth from the leading to the trailing face thereof and has an underside adapted to seat to a vehicle exterior surface, as to an automobile hood in front of the windshield, and means on said underside facilitating its attachment to a mounting surface.

16. A thermometer device according to claim 12, said face plate including plate portions connecting said recessed central portion and said end portions and said plate portions having openings therein accommodating the passage therethrough to the ends of said thermometer.

17. A thermometer device according to claim 12 said housing having a relatively low and wide profile when observing its trailing face and being relatively short in depth from leading to trailing face, the central portion of said face plate being connected to the end portions thereof by plate portions in longitudinally spaced facing relation to define thereby with the end portions of said housing said interior chambers, said facing plate portions being apertured for passage of the respective ends of said thermometer therethrough, said thermometer positioning thereby horizontally in front of said recessed central portion of said face plate and the indicia of said temperature scale positioning on said central portion to enable readouts of indicated temperature.

18. A thermometer device as in claim 12 wherein means are provided to essentially shield said sensing portion of said thermometer element from the disruptive influence of the direct rays or reflection of the rays of the sun.

19. A thermometer unit as in claim 1 wherein means are provided for adjusting the position of the readout portion of said thermometer element relative to said housing to maximize viewing capabilities for the user.

20. A thermometer device comprising a thermometer including a readout sensing portion and a readout portion, a housing, said housing including a shell one side of which is open and capped by a plate forming the face of said housing to be presented to the viewer, said plate having a portion offset inwardly of said shell to define at said face of said housing a recess bounded by top, bottom and side portions of said housing, an end portion of said face plate forming with other portions of said housing a chamber, said face plate embodying means to which said thermometer is slip fit to position said sensing portion of said thermometer in said chamber in an isolated relation to said readout portion of said thermometer, the slip fit being provided by means precluding endwise motion of said thermometer relative said face plate.

21. A thermometer device as in claim 20 wherein said thermometer has in connection therewith means made accessible by said housing for the adjustment thereof within said housing to optimize the viewing capabilities of the user.

22. A thermometer device as in claim 20 wherein said housing, in cross section, extending from said face to an opposite face thereof is aerodynamically contoured to have upper and lower wall portions which merge at the limit of said opposite face which is outermost from the first said face of said housing.

* * * * *

UNITED STATES PATENT OFFICE
CERTIFICATE OF CORRECTION

Patent No. 4,218,917                    Dated August 26, 1980

Inventor(s) Robert K. Stortz

It is certified that error appears in the above-identified patent and that said Letters Patent are hereby corrected as shown below:

Col. 3, line 30, -- from -- is inserted following "somewhat";

line 54, "20" is corrected to read -- 10 --.

Col. 4, line 3, "The" (first occurrence) is corrected to read -- That --;

line 43, "holder" is corrected to read -- holders --.

Col. 5, line 35, "of" is corrected to read -- in --.

Col. 6, line 36, "an" is corrected to read -- and --.

Col. 7, line 38, "fature" is corrected to read -- feature --;

line 41, "chance" is corrected to read -- chances --.

Signed and Sealed this

Ninth Day of December 1980

[SEAL]

Attest:

SIDNEY A. DIAMOND

*Attesting Officer*     *Commissioner of Patents and Trademarks*